United States Patent
Agiwal et al.

(10) Patent No.: US 11,805,556 B2
(45) Date of Patent: Oct. 31, 2023

(54) METHOD AND APPARATUS FOR HANDLING SIDELINK COMMUNICATION ACCORDING TO TYPE OF HANDOVER

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 17/503,916

(22) Filed: Oct. 18, 2021

(65) Prior Publication Data

US 2022/0132587 A1    Apr. 28, 2022

(30) Foreign Application Priority Data

Oct. 22, 2020 (KR) .......................... 10-2020-0137784

(51) Int. Cl.
*H04W 74/08* (2009.01)
*H04L 1/1867* (2023.01)
*H04W 76/27* (2018.01)

(52) U.S. Cl.
CPC ....... *H04W 74/0833* (2013.01); *H04L 1/1887* (2013.01); *H04W 76/27* (2018.02)

(58) Field of Classification Search
CPC . H04W 74/0833; H04W 36/24; H04W 76/19; H04W 76/27; H04W 72/20
See application file for complete search history.

(56) References Cited

U.S. PATENT DOCUMENTS

| | | | |
|---|---|---|---|
| 2019/0356460 A1 | 11/2019 | Tsuboi et al. | |
| 2021/0022055 A1* | 1/2021 | Tseng | H04W 36/0094 |
| 2021/0345200 A1* | 11/2021 | Jang | H04W 56/001 |
| 2022/0070779 A1* | 3/2022 | Li | H04W 4/40 |
| 2022/0394581 A1* | 12/2022 | Kim | H04W 36/0055 |
| 2023/0022967 A1* | 1/2023 | Chang | H04W 76/18 |
| 2023/0043592 A1* | 2/2023 | Tsuboi | H04W 76/15 |

FOREIGN PATENT DOCUMENTS

| | | |
|---|---|---|
| WO | 2020/197249 A1 | 10/2020 |
| WO | 2020/210077 A1 | 10/2020 |

OTHER PUBLICATIONS

3GPP; TSG RAN; NR; RRC protocol specification (Release 16)', 3GPP TS 38.331 V16.2.0, Oct. 7, 2020 sections 5.3.5.3, 5.3.5.14, Oct. 7, 2020.
Huawei et al., 'Clarification on TS38.331 for DAPS', R2-2008169, 3GPP TSG-RAN WG2 Meeting #111 electronic, Online, Sep. 1, 2020 section 5.3.5.
International Search Report dated Jan. 7, 2022, issued in International Patent Application No. PCT/KR2021/014490.

* cited by examiner

*Primary Examiner* — Gary Mui
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method and apparatus for handling sidelink communication according to type of handover are provided.

20 Claims, 13 Drawing Sheets

METHOD AND APPARATUS FOR HANDLING SIDELINK COMMUNICATION ACCORDING TO TYPE OF HANDOVER

CROSS-REFERENCE TO RELATED APPLICATION(S)

This application is based on and claims priority under 35 U.S.C. § 119(a) of a Korean patent application number 10-2020-0137784, filed on Oct. 22, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus, a method and a system of handling sidelink (SL) communication according to type of handover in wireless communication system.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post Long-Term Evolution (LTE) System'. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on sidelink (SL) communication handling in wireless communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a source base station, a first radio resource control (RRC) message including information on sidelink parameters for sidelink communication, applying the sidelink parameters included in the first RRC message to a first medium access control (MAC) entity associated with the source base station, receiving, from the source base station, a second RRC message including reconfiguration with synchronization information and information on sidelink parameters for sidelink communication, generating a second MAC entity associated with a target base station, in case that at least one dual active protocol stack (DAPS) bearer is configured in the second RRC message, applying the sidelink parameters included in the second RRC message to the second MAC entity associated with the target base station, and performing a random access procedure with the target base station based on the second RRC message.

In accordance with another aspect of the disclosure, a method performed by a base station is provided. The method includes transmitting, to a terminal, a first radio resource control (RRC) message including information on sidelink parameters for sidelink communication, the sidelink parameters included in the first RRC message are for a first medium access control (MAC) entity associated with the source base station, and transmitting, to the terminal, a second RRC message including reconfiguration with synchronization information and information on sidelink parameters for sidelink communication, the sidelink parameters included in the second RRC message are for a second MAC entity associated with a target base station, wherein the second MAC entity is generated for the target base station, in case that at least one dual active protocol stack (DAPS) bearer is configured in the second RRC message, and wherein a random access procedure is performed between the terminal and the target base station based on the second RRC message.

In accordance with another aspect of the disclosure, a terminal is provided. The terminal includes a transceiver, and a controller configured to receive, from a source base station, a first radio resource control (RRC) message including information on sidelink parameters for sidelink communication, apply the sidelink parameters included in the first RRC message to a first medium access control (MAC) entity associated with the source base station, receive, from the source base station, a second RRC message including reconfiguration with synchronization information and information on sidelink parameters for sidelink communication, generate a second MAC entity associated with a target base station, in case that at least one dual active protocol stack (DAPS) bearer is configured in the second RRC message, apply the sidelink parameters included in the second RRC message to the second MAC entity associated with the target base station, and perform a random access procedure with the target base station based on the second RRC message.

In accordance with another aspect of the disclosure, a base station is provided. The base station includes a transceiver and a controller configured to transmit, to a terminal, a first radio resource control (RRC) message including information on sidelink parameters for sidelink communication, the sidelink parameters included in the first RRC message are for a first medium access control (MAC) entity associated with the source base station, and transmit, to the terminal, a second RRC message including reconfiguration with synchronization information and information on sidelink parameters for sidelink communication, the sidelink parameters included in the second RRC message are for a second MAC entity associated with a target base station, wherein the second MAC entity is generated for the target base station, in case that at least one dual active protocol stack (DAPS) bearer is configured in the second RRC message, and wherein a random access procedure is performed between the terminal and the target base station based on the second RRC message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
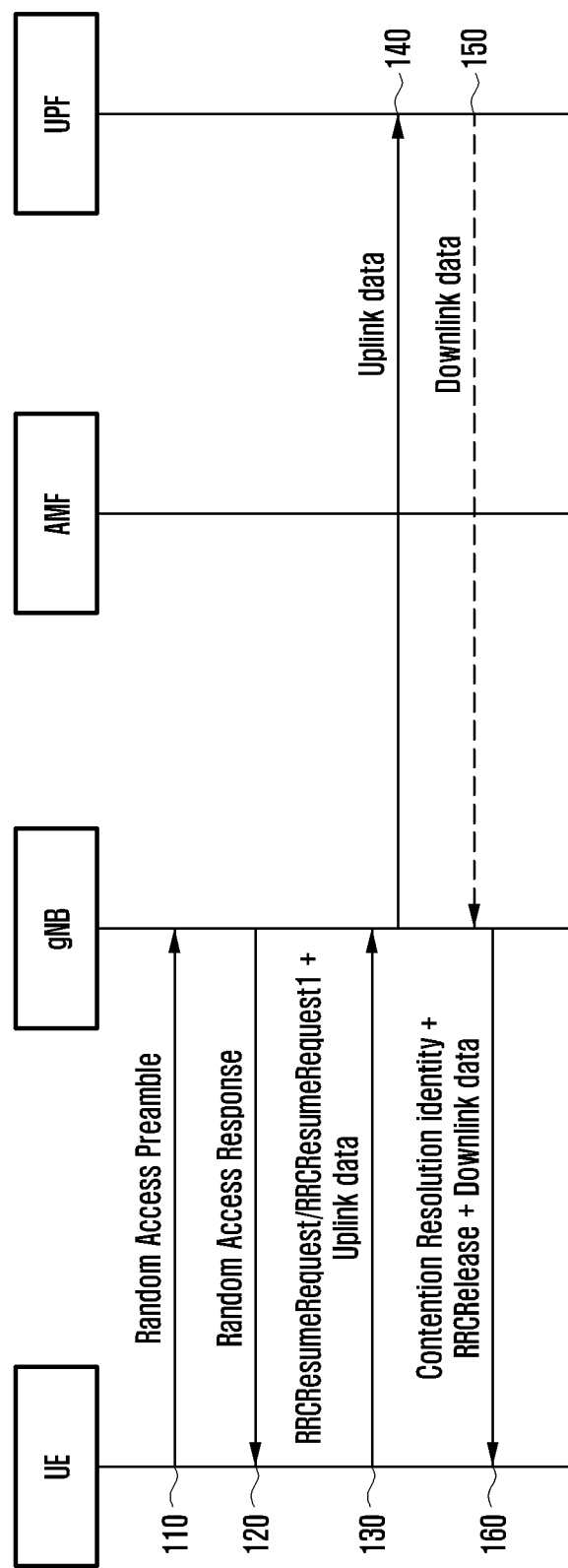
FIG. 1 illustrates an example of small data transmission according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or next generation node B (gNB).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the 4G wireless communication system suffers from lack of resources to meet the growing demand for high speed data services. So 5G wireless communication system is being developed to meet the growing demand for high speed data services, support ultra-reliability and low latency applications.

The 5G wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of 5G wireless communication system. In addition, the 5G wireless communication system is expected to address different use cases having quite different requirements in terms of data rate, latency, reliability, mobility etc. However, it is expected that the design of the air-interface of the 5G wireless communication system would be flexible enough to serve the UEs having quite different capabilities depending on the use case and market segment the UE cater service to the end customer. Few example use cases the 5G wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the wireless broadband subscribers needing internet connectivity everywhere, according to the related art, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the 5G wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The 5G wireless communication system (also referred as next generation radio or NR), supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either E-UTRA (Evolved Universal Mobile Telecommunications System (UNITS) Terrestrial Radio Access) (i.e. if the node is an ng-eNB) or NR access (i.e. if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the Primary Cell (PCell) and optionally one or more Secondary Cells (SCells). In NR the term Secondary Cell Group (SCG) refers to a group of serving cells associated with the Secondary Node, comprising of the Primary SCG Cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the 5G wireless communication system (or NR), Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid automatic repeat request (HARQ) information related to downlink shared channel (DL-SCH); Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In NR, a list of search space configurations is signaled by gNB for each configured bandwidth part (BWP) wherein each search configuration is uniquely identified by an identifier. Identifier of search space configuration to be used for specific purpose such as paging reception, system information (SI) reception, random access response (RAR) reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot}) \bmod (\text{Monitoring-periodicity-PDCCH-slot})=0; \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of TCI (Transmission configuration indicator) states. One DL reference signal (RS) identifier (ID) (SSB or channel state information reference signal (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

In NR bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP).

BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+ 14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for SCell, etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non-dedicated preamble. Dedicated preambles is typically provided for a subset of SSBs/CSI-RSs. If there is no SSB/CSI-RS having DL reference signal received power (RSRP) above a threshold amongst the SSBs/CSI-RSs for which contention free random access resources (i.e. dedicated preambles/ROs) are provided by gNB, UE select non-dedicated preamble. Otherwise UE select dedicated preamble. So, during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the MsgA configurable number of times, UE fallbacks to 4 step RACH procedure i.e. UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble(s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non-dedicated preamble. Dedicated preambles are typically provided for a subset of SSBs/CSI-RSs. If there is no SSB/CSI-RS having DL RSRP above a threshold amongst the SSBs/CSI-RSs for which contention free random access resources (i.e. dedicated preambles/ROs/PUSCH resources) are provided by gNB, UE select non dedicated preamble. Otherwise UE select dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.
else if 4 step contention free random access resources are signaled by gNB for this random access procedure, UE selects 4 step RACH.
else if the UL BWP selected for this random access procedure is configured with only 2 step RACH resources, UE selects 2 step RACH.
else if the UL BWP selected for this random access procedure is configured with only 4 step RACH resources, UE selects 4 step RACH.
else if the UL BWP selected for this random access procedure is configured with both 2 step and 4 step RACH resources,
if RSRP of the downlink pathloss reference is below a configured threshold, UE selects 4 step RACH. Otherwise UE selects 2 step RACH.

In the 5G wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the 5G wireless communication system (also referred as next generation radio or NR), System Information (SI) is divided into the master information block (MIB) and a number of system information blocks (SIBs) where:
the MIB is always transmitted on the BCH with a periodicity of 80 ms and repetitions made within 80 ms and it includes parameters that are needed to acquire SIB1 from the cell.
the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).
SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID.

In the 5G wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous (DRX) may be configured by upper layers. The UE monitors Short Messages transmitted with paging RNTI (P-RNTI) over DCI; monitors a Paging channel for CN paging using 5G-S-temporary mobile subscriber identity (5G-S-TMSI); performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RAN based notification area (RNA) update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes signaling radio bearer(s) (SRB(s)) and data radio bearer(s) (DRB(s)). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Upon initiating the resume procedure, UE:
apply the default L1 parameter values as specified in corresponding physical layer specifications, except for the parameters for which values are provided in SIB1;
apply the default MAC Cell Group configuration
apply the CCCH configuration
start timer T319;
apply the timeAlignmentTimerCommon included in SIB1
apply the default SRB1 configuration
set the variable pending RNA-Update to false;
initiate transmission of the RRCResumeRequest message or RRCResumeRequest1
restore the RRC configuration, RoHC state, the stored QoS flow to DRB mapping rules and the KgNB and $K_{RRCint}$ keys from the stored UE Inactive AS context except for the following:
masterCellGroup;
mrdc-SecondaryCellGroup, if stored; and
pdcp-Config;
set the resumeMAC-I to the 16 least significant bits of the MAC-I calculated:
with the $K_{RRCint}$ key in the UE Inactive AS Context and the previously configured integrity protection algorithm; and
with all input bits for COUNT, BEARER and DIRECTION set to binary ones;
derive the KgNB key based on the current KgNB key or the NH, using the stored nextHopChainingCount value;
derive the $K_{RRCenc}$ key, the $K_{RRCint}$ key, the $K_{UPint}$ key and the $K_{UPenc}$ key;
configure lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE;
configure lower layers to apply ciphering for all signaling radio bearers except SRB0 and to apply the configured ciphering algorithm, the $K_{RRCenc}$ key and the $K_{UPenc}$ key derived, i.e. the ciphering configuration shall be applied to all subsequent messages received and sent by the UE;
re-establish PDCP entities for SRB1;
resume SRB1;
transmit RRCResumeRequest or RRCResumeRequest1.

In 5G wireless communication system, small data transmission (SDT) in RRC_INACTIVE is supported. The uplink data can be transmitted in Msg3 in 4 step RA procedure, and can be transmitted in MsgA in 2 step RA procedure. FIG. 1 is an example signaling flow for small data transmission using 4 step RA.

FIG. 1 illustrates an example of small data transmission according to an embodiment of the disclosure.

Referring to FIG. 1, criteria to initiate 4 step RA for SDT is met. UE select preamble/RO from preambles/ROs for SDT. UE transmits random access preamble and receives RAR including UL grant for Msg3 transmission (110, 120).

The UE sends an RRCResumeRequest/RRCResumeRequest1 to the gNB (same as the last serving GNB) on SRB 0 (130). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA (NR integrity algorithm) or EIA (EPS integrity algorithm)) in the stored AS security context, which was negotiated between the UE and the last serving gNB and the $K_{RRCint}$ from the stored AS security context with the following inputs:
KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source physical cell identity (PCI) (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes SRB(s) and DRB(s), derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

The gNB validates the resumeMAC-I and delivers the uplink data to UPF (140).

The gNB sends the RRCRelease message to keep the UE in RRC_INACTIVE. PDCCH is addressed to temporary C-RNTI (TC-RNTI). If downlink data is available, they are sent ciphered and integrity protected (Only for DRBs configured with UP integrity protection) on DTCH multiplexed with the RRCRelease message on DCCH (150, 160).

Figure 2:
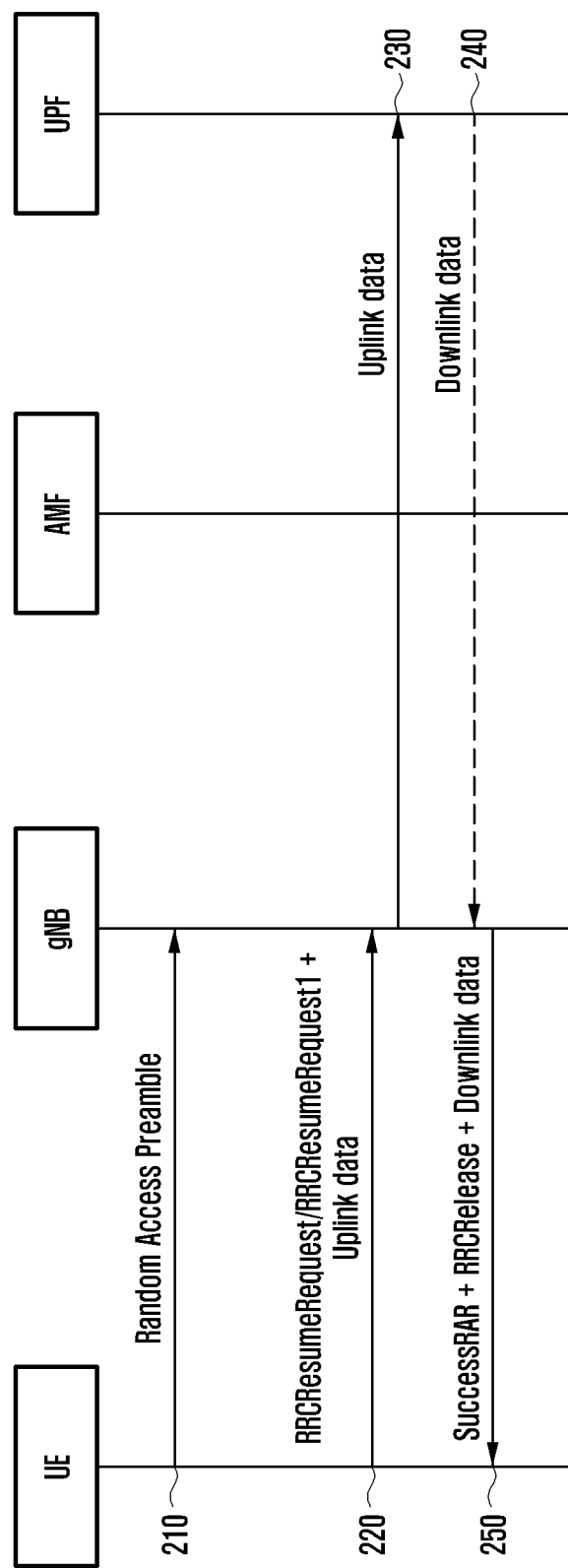
FIG. 2 illustrates another example of small data transmission according to an embodiment of the disclosure.

FIG. 2 shows the signaling flow for small data transmission using 2 step RA. FIG. 2 illustrates another example of small data transmission according to an embodiment of the disclosure.

Referring to FIG. 2, criteria to initiate 2 step RA for SDT is met. UE select preamble/RO/PO from preambles/ROs/POs for SDT. UE transmits random access preamble (210).

In the MsgA payload, the UE sends an RRCResumeRequest/RRCResumeRequest1 to the gNB (same as the last serving GNB) on SRB 0 (220). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (MA or EIA) in the stored AS security context, which was negotiated between the UE and the last serving gNB and the $K_{RRCint}$ from the stored AS security context with the following inputs:
KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)

source C-RNTI (Set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

The gNB validates the resumeMAC-I and delivers the uplink data to UPF (230).

3. The gNB sends the RRCRelease message to keep the UE in RRC_INACTIVE in MsgB along with successRAR. PDCCH is addressed to C-RNTI. If downlink data is available, they are sent ciphered and integrity protected (Only for DRBs configured with UP integrity protection) on DTCH multiplexed with the RRCRelease message on DCCH (240, 250).

Figure 3:
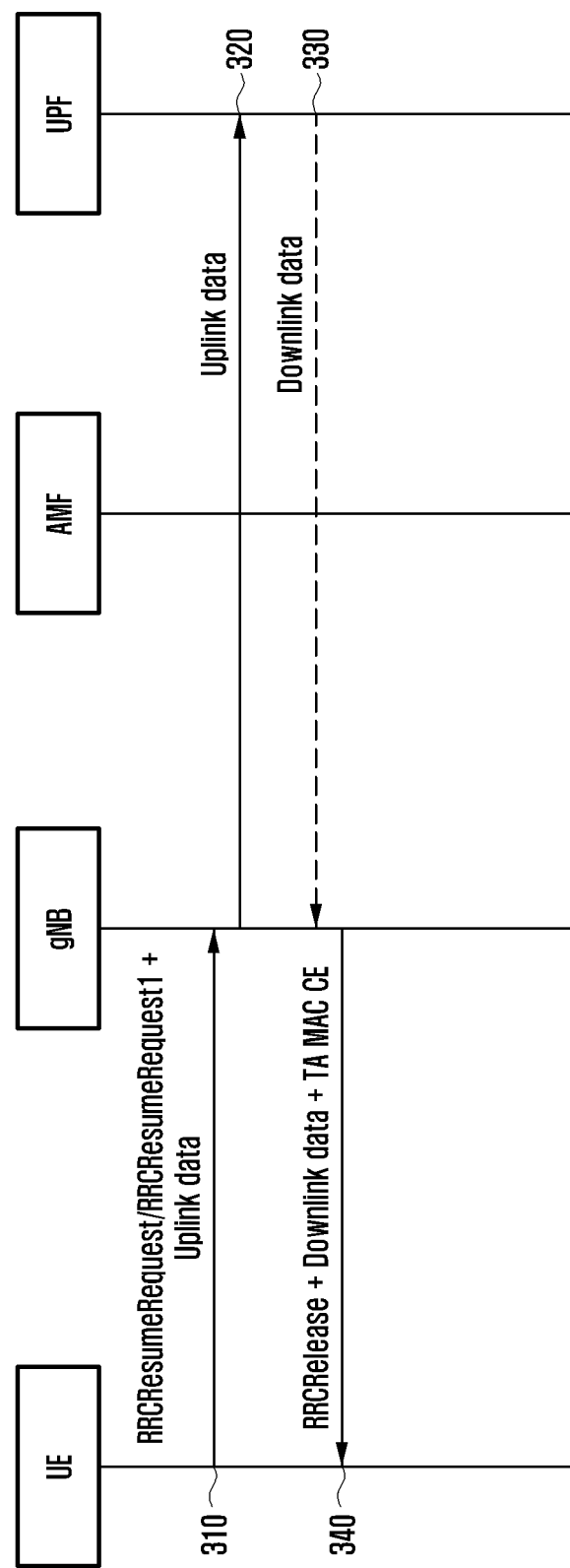
FIG. 3 illustrates another example of small data transmission according to an embodiment of the disclosure.

FIG. 3 shows the signaling flow for small data transmission using preconfigured PUSCH resource. FIG. 3 illustrates another example of small data transmission according to an embodiment of the disclosure.

Criteria to initiate SDT using preconfigured PUSCH resources is met.

Referring to FIG. 3, in the preconfigured PUSCH resource, the UE sends an RRCResumeRequest/RRCResumeRequest1 to the gNB (same as the last serving GNB) on SRB 0 (310). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (MA or EIA) in the stored AS security context, which was negotiated between the UE and the last serving gNB and the $K_{RRCint}$ from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH.

The UE can alternately transmit its small data by using one of the following options:

RRCResumeRequest (or new RRC message). resumeIdentity, ResumeMAC-I, resumeCause, NAS container in RRCResumeRequest/RRCResumeRequest1. NAS container includes UL data.

new MAC CE (resumeIdentity, ResumeMAC-I)+uplink data (on DTCH). resumeIdentity is provided for UE identification purpose. ResumeMAC-I is for security The gNB validates the resumeMAC-I and delivers the uplink data to UPF (320).

The gNB sends the RRCRelease message to keep the UE in RRC_INACTIVE. The PDCCH is addressed to C-RNTI. The C-RNTI is the one which the UE used in cell from which it received preconfigured PUSCH resources. Alternately, the C-RNTI can be assigned along with preconfigured PUSCH resources. If downlink data is available, they are sent ciphered and integrity protected (Only for DRBs configured with UP integrity protection) on DTCH multiplexed with the RRCRelease message on DCCH (330, 340).

(Alternate 1) We can consider an alternate signaling flow wherein gNB can schedule UL grant (PDCCH addressed to C-RNTI) before RRCRelease. In the UL transmission UE can indicate if it has more data to transmit. If UE has more data to transmit, gNB can schedule UL grant. Otherwise RRCRelease is transmitted. In the UL transmission, UE can also include SSB ID(s) of SSB above threshold if the SSB indicated by PRACH preamble is no longer suitable.

(Alternate 2) Alternately, the gNB can transmit PDCCH addressed to RNTI (i.e. RNTI is the one assigned by gNB along with preconfigured resource, it can be assigned to other UEs as well) and scheduled DL transport block (TB) includes contention resolution identity (it is first X bits (e.g. 48 bits) of resume message) and C-RNTI. If it matches with UE's contention resolution identity, UE stops the monitoring timer and UE can consider small data transmission as successful.

In the response of the small data transmission, UE can receive a signal (RRC message or DCI) for the following purpose: releasing pre-configured PUSCH or switching to resume procedure (i.e. RRC_CONNECTED).

Figure 4:
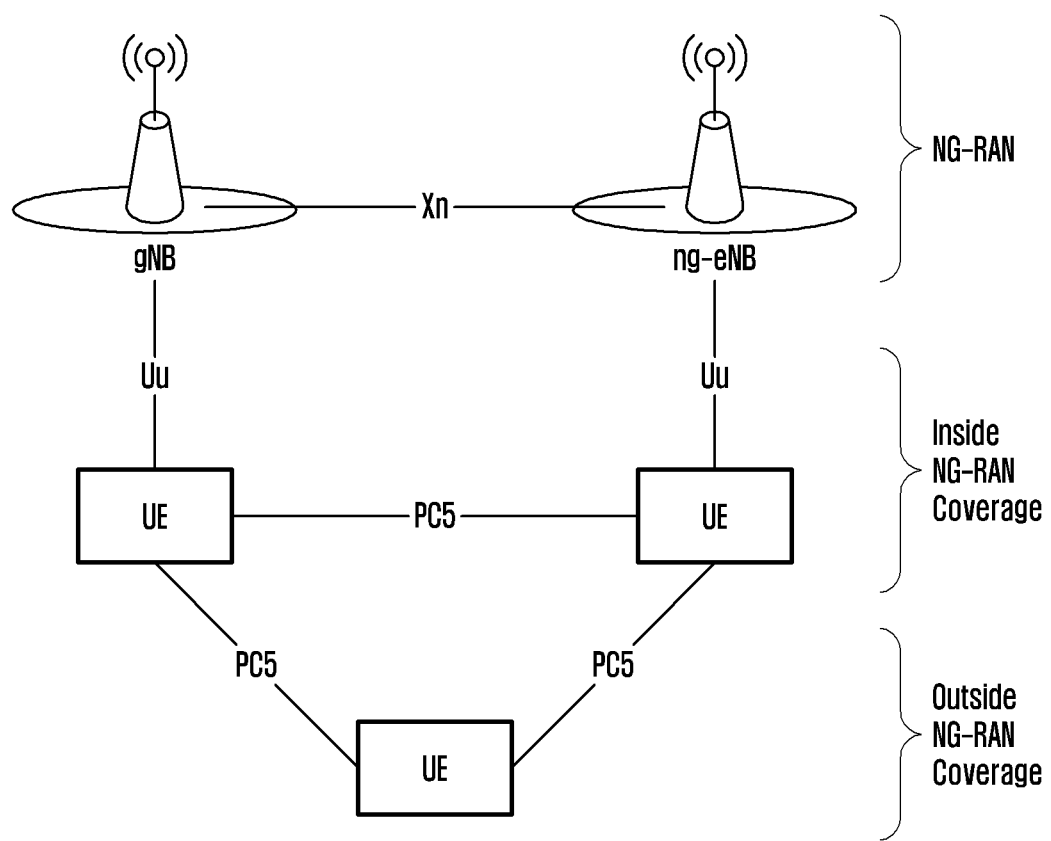
FIG. 4 illustrates an architecture supporting PC5 interface according to an embodiment of the disclosure.

FIG. 4 illustrates an architecture supporting PC5 interface according to an embodiment of the disclosure.

Referring to FIG. 4, 4G and 5G wireless communication system supports vehicular communication services. Vehicular communication services, represented by Vehicle-to-Everything (V2X) services, can consist of the following four different types: Vehicle-to-Vehicle (V2V), Vehicle-to-Infrastructure (V2I), Vehicle-to-Network (V2N) and Vehicle-to-Pedestrian (V2P). In 5G (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics.

3) Advanced Driving enables semi-automated or full-automated driving. Each vehicle and/or Road Side Unit (RSU) shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

V2X services can be provided by PC5 interface and/or Uu interface. Support of V2X services via PC5 interface is provided by NR sidelink (SL) communication or V2X sidelink communication, which is a mode of communication whereby UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 4. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes.

Unicast transmission, characterized by support of at least one PC5-RRC connection between peer UEs; Transmission and reception of control information and user traffic between peer UEs in sidelink; Support of sidelink HARQ feedback; Support of radio link control (RLC) acknowledged mode (AM); and Support of sidelink radio link monitoring (RLM) for both peer UEs to detect radio link failure (RLF).
  Groupcast transmission, characterized by: Transmission and reception of user traffic among UEs belonging to a group in sidelink; Support of sidelink HARQ feedback.
  Broadcast transmission, characterized by: Transmission and reception of user traffic among UEs in sidelink.

The AS protocol stack for the control plane in the PC5 interface consists of RRC, packet data convergence protocol (PDCP), RLC and MAC sublayer, and the physical layer. The AS protocol stack for user plane in the PC5 interface consists of SDAP, PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different sidelink control channels (SCCHs) are configured for PC5-RRC and PC5-S signaling respectively.

The MAC sublayer provides the following services and functions over the PC5 interface: Radio resource selection; Packet filtering; Priority handling between uplink and sidelink transmissions for a given UE; Sidelink CSI reporting. With logical channel prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a sidelink shared channel (SL-SCH) MAC header including portions of both Source Layer-2 ID and a Destination Layer-2 ID is added to each MAC PDU. LCID included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);
  Sidelink Traffic Channel (STCH): a sidelink channel for transmitting user information from one UE to other UE(s);
  Sidelink Broadcast Control Channel (SBCCH): a sidelink channel for broadcasting sidelink system information from one UE to other UE(s).

The following connections between logical channels and transport channels exist:

SCCH can be mapped to SL-SCH;
  STCH can be mapped to SL-SCH;
  SBCCH can be mapped to SL-BCH.

The RRC sublayer provides the following services and functions over the PC5 interface:

Transfer of a PC5-RRC message between peer UEs;
  Maintenance and release of a PC5-RRC connection between two UEs;
  Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed, UE releases the PC5-RRC connection.

The UE can operate in two modes for resource allocation in sidelink:

Scheduled resource allocation, characterized by:
    The UE needs to be RRC_CONNECTED in order to transmit data;
    NG-RAN schedules transmission resources.
  UE autonomous resource selection, characterized by:
    The UE can transmit data when inside NG-RAN coverage, irrespective of which RRC state the UE is in, and when outside NG-RAN coverage;
    The UE autonomously selects transmission resources from a pool of resources.

For NR sidelink communication, the UE performs sidelink transmissions only on a single carrier.

The two modes for resource allocation are described in detail as below.

Scheduled Resource Allocation: NG-RAN can dynamically allocate resources to the UE via the sidelink RNTI (SL-RNTI) on PDCCH(s) for NR sidelink Communication. In addition, NG-RAN can allocate sidelink resources to UE with two types of configured sidelink grants:

With type 1, RRC directly provides the configured sidelink grant for NR sidelink communication With type 2, RRC provides the periodicity of the configured sidelink grant while PDCCH can either signal and activate the configured sidelink grant, or deactivate it. The PDCCH provides the actual grant (i.e. resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (or, logical channel group (LCG) per destination in the UE. Eight LCGs are used for reporting of the sidelink buffer status reports. Two formats, which are SL BSR and truncated SL BSR, are used.

UE Autonomous Resource Allocation: The UE autonomously selects sidelink grant from a pool of resources provided by broadcast system information or dedicated signaling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g. reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with Global Navigation Satellite System (GNSS) in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

In NR, dual active protocol stack (DAPS) handover (HO) is supported wherein the UE can communicate with source PCell and Target Cell concurrently. In case of DAPS HO, two MAC entities exist concurrently for MCG. During the DAPS HO Existing MAC entity of MCG is not reset and New MAC entity of MCG is created. Existing MAC entity (referred as Source MCG MAC entity), handles DL/UL of DAPS bearer during HO and handles UL of DAPS bearer until source is released after HO. New MAC entity (referred as Target MCG MAC entity), handles DL/UL of SRBs during HO and after HO, it handles DL/UL of SRBs/DRBs. Here, embodiment of performing SL MAC operation using two MAC entities is described in detail.

Embodiment 1—SL Communication Handling

Figure 5A:
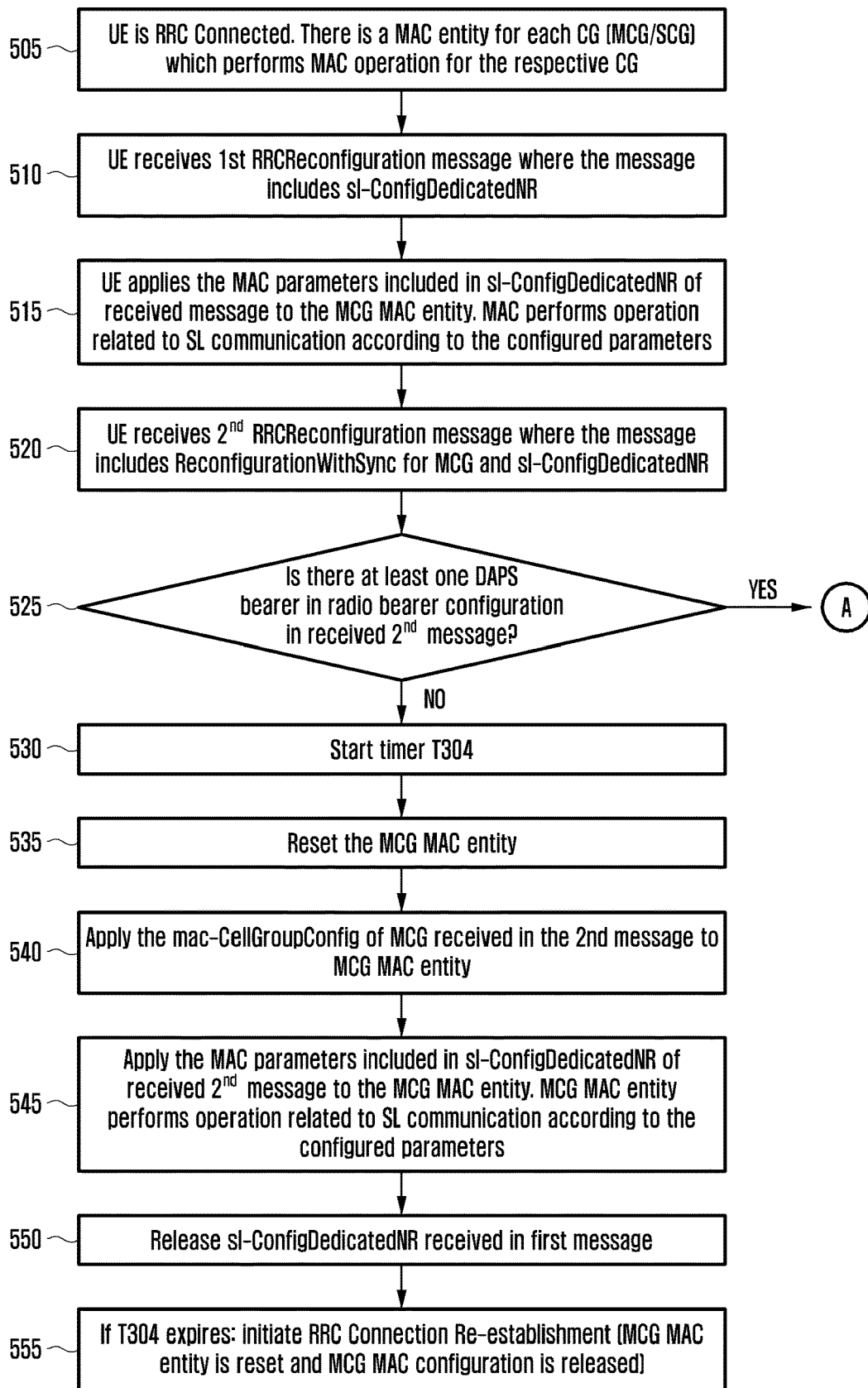
FIG. 5A illustrates an example of a sidelink (SL) communication handling according to an embodiment of the disclosure.
Figure 5B:
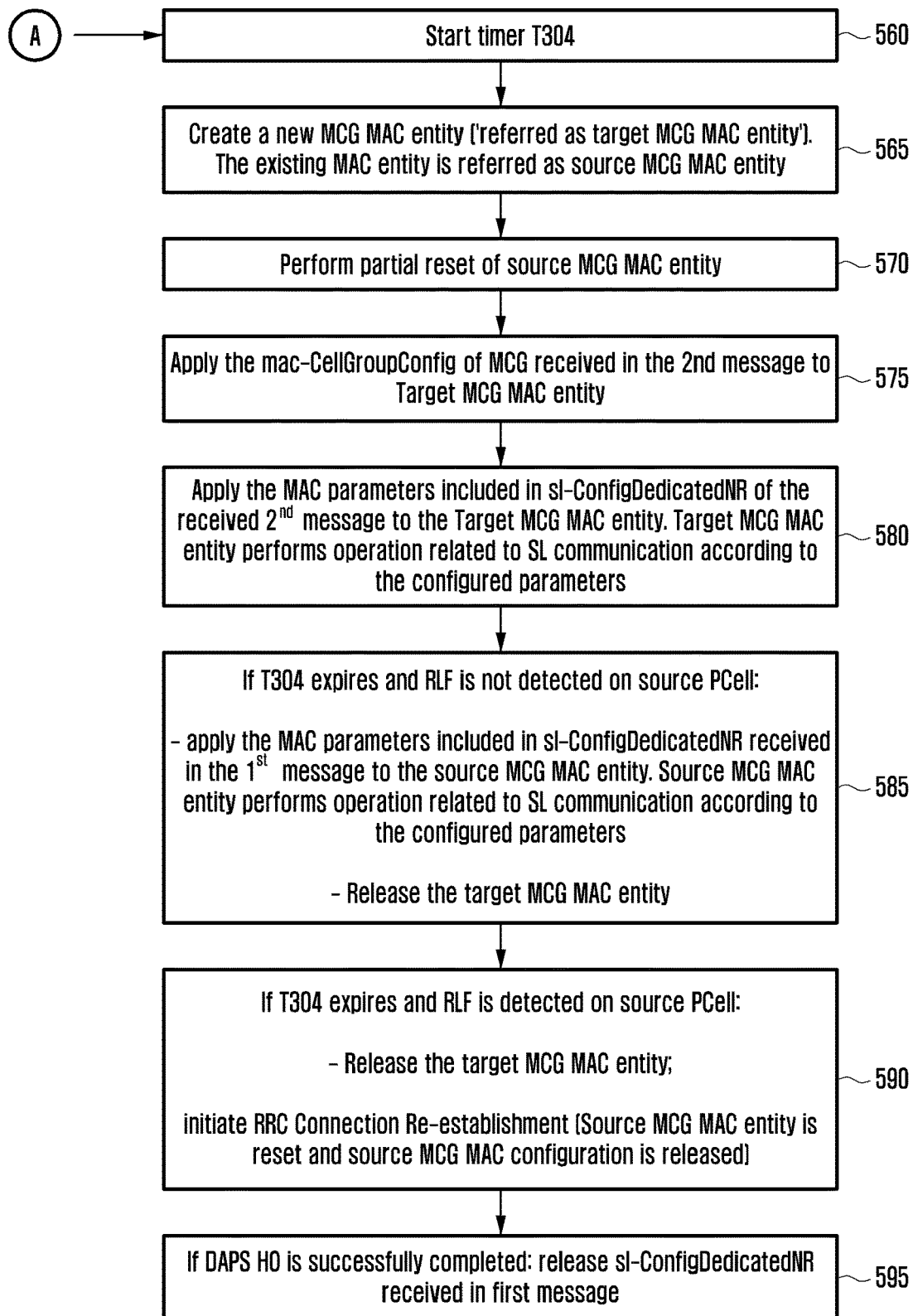
FIG. 5B illustrates another example of an SL communication handling according to an embodiment of the disclosure.

FIGS. 5A and 5B illustrate an example of a sidelink (SL) communication handling according to various embodiment of the disclosure.

1. UE is in RRC_CONNECTED state. There are MAC entities for each CGs (MCG and SCG) which perform the MAC operation for the respective CGs (505). Note that if SCG is not configured, there will be only one MAC entity i.e. MAC entity for MCG.

2. UE receives the first RRCReconfiguration message from gNB where the message includes sl-ConfigDedicatedNR IE (510). sl-ConfigDedicatedNR IE includes the dedicated SL communication parameters/configuration.

3. UE applies the MAC parameters included in sl-ConfigDedicatedNR of received first message to the MCG MAC entity. MAC performs operation related to SL communication according to the configured parameters (515).

4. UE receives 2nd RRCReconfiguration message where the message includes ReconfigurationWithSync IE for MCG and sl-ConfigDedicatedNR IE (520).

5. Upon receiving the second message, UE checks if there is at least one DAPS bearer in radio bearer configuration in received 2nd message (525).

6. if there is no DAPS bearer in radio bearer configuration in received second message (525), UE perform the following operation:

Start the timer T304 (530).

Reset the MCG MAC entity (535). Operations for MAC reset are described later.

Apply the mac-CellGroupConfig of MCG received in the 2nd message to MCG MAC entity (540).

Apply the MAC parameters included in sl-ConfigDedicatedNR of received 2nd message to the MCG MAC entity. MCG MAC entity performs operation related to SL communication according to the configured parameters (545).

Release sl-ConfigDedicatedNR received in first message (550).

Initiate random access towards the target SpCell.

If T304 expires: initiate RRC Connection Re-establishment wherein the MCG MAC entity is reset and MCG MAC configuration is released (555).

7. if there is at least one DAPS bearer in radio bearer configuration in received second message (525), UE perform the following operation:
  Start the timer T304 (560).
  Create a new MCG MAC entity ('referred as target MCG MAC entity'). The existing MAC entity is referred as source MCG MAC entity (565).
  Perform partial reset of source MCG MAC entity (570). Source MCG MAC entity operation related to SL communication is stopped. Operation for partial MAC reset are described later.
  Apply the mac-CellGroupConfig of MCG received in the 2nd message to Target MCG MAC entity (575).
  Apply the MAC parameters included in sl-ConfigDedicatedNR of the received 2nd message to the Target MCG MAC entity. Target MCG MAC entity performs operation related to SL communication according to the configured parameters (580).
  Initiate random access towards the target SpCell.
  If T304 expires and RLF is not detected on source PCell (585):
    apply the MAC parameters included in sl-ConfigDedicatedNR received in the 1st message to the source MCG MAC entity. Source MCG MAC entity performs operation related to SL communication according to the configured parameters.
    Release the target MCG MAC entity.
  If T304 expires and RLF is detected on source PCell (590):
    Release the target MCG MAC entity;
    initiate RRC Connection Re-establishment. Source MCG MAC entity is reset and source MCG MAC configuration is released.
  If DAPS HO is successfully completed (i.e. random access procedure on target SpCell is successfully completed before the T304 expires): release sl-ConfigDedicatedNR received in first message (595).
Here, operation for MAC reset is described:
If a reset of the MAC entity is requested by upper layers, the MAC entity shall:
  initialize Bj for each logical channel to zero;
  stop (if running) all timers;
  consider all timeAlignmentTimers as expired and perform the corresponding actions;
  set the new data indicators (NDIs) for all uplink HARQ processes to the value 0;
  sets the NDIs for all HARQ process IDs to the value 0 for monitoring PDCCH in Sidelink resource allocation mode 1;
  stop, if any, ongoing RACH procedure;
  discard explicitly signaled contention-free Random Access Resources for 4-step RA type and 2-step RA type, if any;
  flush Msg3 buffer;
  flush MSGA buffer;
  cancel, if any, triggered Scheduling Request procedure;
  cancel, if any, triggered Buffer Status Reporting procedure;
  cancel, if any, triggered Power Headroom Reporting procedure;
  cancel, if any, triggered consistent listen-before-talk (LBT) failure;
  cancel, if any, triggered BFR;
  cancel, if any, triggered Sidelink Buffer Status Reporting procedure;
  flush the soft buffers for all DL HARQ processes;
  for each DL HARQ process, consider the next received transmission for a TB as the very first transmission;
  release, if any, Temporary C-RNTI;
  reset all BFI_COUNTERs;
  reset all LBT_COUNTERs.
Here, operation performed for partial MAC reset is described:
If a partial reset of the MAC entity is requested by upper layers, the MAC entity shall:
  sets the NDIs for all HARQ process IDs to the value 0 for monitoring PDCCH in Sidelink resource allocation mode 1;
  cancel, if any, triggered Sidelink Buffer Status Reporting procedure;
  cancel, if any, triggered Scheduling Request procedure for sidelink
  flush the soft buffers for all Sidelink processes
  Stop (if running) all timers related to Sidelink
In another method of this disclosure the UE operation is described below.
  1. UE is in RRC_CONNECTED state. There is a MAC entity for each CG (MCG and SCG) which performs the MAC operation for the respective CG. Note that if SCG is not configured, there will be only one MAC entity i.e. MAC entity for MCG.
  2. UE receives the first RRCReconfiguration message from gNB where the message includes sl-ConfigDedicatedNR IE. sl-ConfigDedicatedNR IE includes the dedicated SL communication parameters/configuration.
  3. UE applies the MAC parameters included in sl-ConfigDedicatedNR of received first message to the MCG MAC entity. MAC performs operation related to SL communication according to the configured parameters.
  4. UE receives 2nd RRCReconfiguration message where the message includes ReconfigurationWithSync IE for MCG and sl-ConfigDedicatedNR IE.
  5. Upon receiving the second message, UE checks if there is at least one DAPS bearer in radio bearer configuration in received 2nd message.
  6. if there is no DAPS bearer in radio bearer configuration in received second message, UE perform the following operation:
    Start the timer T304
    Reset the MCG MAC entity. Operations for MAC reset are described later.
    Apply the mac-CellGroupConfig of MCG received in the 2nd message to MCG MAC entity
    Apply the MAC parameters included in sl-ConfigDedicatedNR of received 2nd message to the MCG MAC entity. MCG MAC entity performs operation related to SL communication according to the configured parameters.
    Release sl-ConfigDedicatedNR received in first message
    Initiate random access towards the target SpCell.
    If T304 expires: initiate RRC Connection Re-establishment wherein the MCG MAC entity is reset and MCG MAC configuration is released.
  7. if there is at least one DAPS bearer in radio bearer configuration in received second message, UE perform the following operation:
    Start the timer T304
    Create a new MCG MAC entity ('referred as target MCG MAC entity'). The existing MAC entity is referred as source MCG MAC entity
    Perform partial reset of source MCG MAC entity. Operation for partial MAC reset are described earlier.

Apply the mac-CellGroupConfig of MCG received in the 2nd message to Target MCG MAC entity Apply the MAC parameters included in sl-ConfigDedicatedNR of the received 2nd message to the Source MCG MAC entity. Source MCG MAC entity performs operation related to SL communication according to the configured parameters. In this embodiment, the MAC parameters included in sl-ConfigDedicatedNR received in the 2nd message is applied to the source MCG MAC entity, instead of target MCG MAC entity of FIG. 5A and FIG. 5B.

Initiate random access towards the target SpCell.

If T304 expires and RLF is not detected on source PCell:
Perform partial reset of source MCG MAC entity (optional, may not be done in one embodiment)
apply the MAC parameters included in sl-ConfigDedicatedNR received in the 1st message to the source MCG MAC entity. Source MCG MAC entity performs operation related to SL communication according to the configured parameters.
Release the target MCG MAC entity If T304 expires and RLF is detected on source PCell:
Release the target MCG MAC entity;
initiate RRC Connection Re-establishment. Source MCG MAC entity is reset and source MCG MAC configuration is released.

If DAPS HO is successfully completed (i.e. random access procedure on target SpCell is successfully completed before the expiry of T304): release sl-ConfigDedicatedNR received in first message Embodiment 2—Paging Handling for MUSIM In the 4G wireless communication system like LTE, there are devices which have Multi Universal Subscriber Identity Module (MUSIM) capability, including dual SIM devices. The dual SIM devices operation is transparent to the network and certain procedures like paging monitoring and responding to paging, measurements, system information acquisition etc. are currently handled in implementation specific way. In other words, there is no standard support for efficiently handling the aforementioned procedures. This has resulted not only in degradation of user experience in terms of loss of data throughput but also wastage of network resources. The dual SIM devices have different radio frequency transmit-receive (RF Tx/Rx) capability and the implementation specific solutions to handle the aforementioned procedures are not same but depend on the RF capability of the dual SIM device. Depending on the RF Tx/Rx capability following types of dual SIM devices are available a) Dual SIM Dual Standby (DSDS) with single Tx/Rx RF capability, Dual SIM Dual Receive (DSDR) with single Tx and dual Rx RF capability and Dual SIM Dual Active (DSDA) with dual Tx/Rx RF capability.

The term dual SIM and MUSIM User Equipment (UE) or device is used interchangeable throughout the disclosure. The dual SIM device is required to monitor the paging occasion and other time critical occasions such as essential SIBs, Cell Broadcast Information, Multimedia Broadcast Multicast Services (MBMS) and the like, on the respective system (network) associated with each USIM. In general, system with each USIM independently decides these occasions. The paging or SI occasion of one USIM may collide with paging and other time critical occasions of other USIMs. These collisions are handled in a specific manner according to UE implementations as there is no standard mechanism devised for MUSIM UE from the 3GPP standardization perspective. Therefore, this may sometime result in missing of the paging or time critical occasions for handling of paging collisions for MUSIM devices. Recently, there is discussion within the 3GPP standardization to specify enablers to handle the aforementioned procedures regardless of the UE RF capability. This would be applicable to LTE system connected to EPC and NR system connected to 5GC. For e.g. a UE may support dual SIM capability associated with Global System for Mobile Communication (GSM)+GSM, GSM+LTE, LTE+LTE, LTE+Voice over LTE (VoLTE), VoLTE+VoLTE, VoLTE+NR, LTE+NR, NR+NR so on and so forth.

The embodiment herein is to disclose methods and system for achieving efficiently handling of paging procedure and system information acquisition by the dual SIM/MUSIM devices regardless of the Tx/Rx capability. This is applicable when the device is registered on evolved packet core (EPC) through both SIMs, registered on 5G core (5GC) through both SIMs or registered on EPC through one SIM and registered on 5GC through the other SIM. The embodiments in the disclosure are illustrated using dual SIM as an example but can be extended further to plurality of SIMs.

In the current design, paging collision occurs if UE's PO in network A overlaps in time with UE's PO in network B. UE send indication to network B to change its PO. Network may provide a new 5G S-TMSI. UE can indicate an offset for determining new PO. The offset can be used to determine a new UE ID where UE is used to determine PF/PO.

In RRC_IDLE/INACTIVE state, UE monitors one PO every DRX cycle T, where T=min (Default Paging Cycle, UE specific paging cycle)

UE determines its PF/PO based on UE ID where UE ID=5G S-TMSI mod 1024

If offset is applied, new UE ID=(5G S-TMSI+offset) mod 1024 or new UE ID=[[5G S-TMSI mod 1024]+Offset] mod 1024 system frame number (SFN) for the PF is determined by:

(SFN+PF offset) mod T=(T div N)*(UE_ID mod N)

Index (i_s), indicating the index of the PO is determined by:

i_s=floor (UE_ID/N) mod Ns, Ns is number of POs per PF, up to 4

In PO, UE monitors PDCCH addressed to P-RNTI

Figure 6:
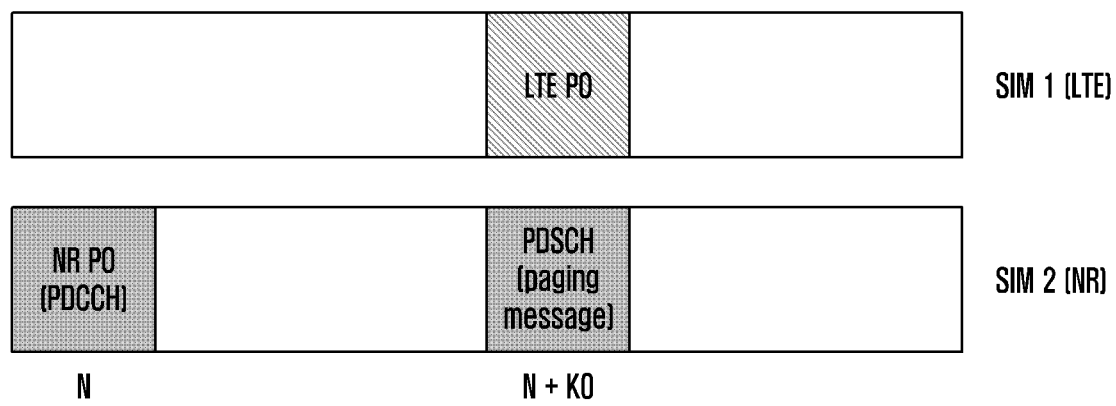
FIG. 6 illustrates an example of paging collision between multiple universal subscriber identity module (MUSIM) according to an embodiment of the disclosure.
Figure 7:
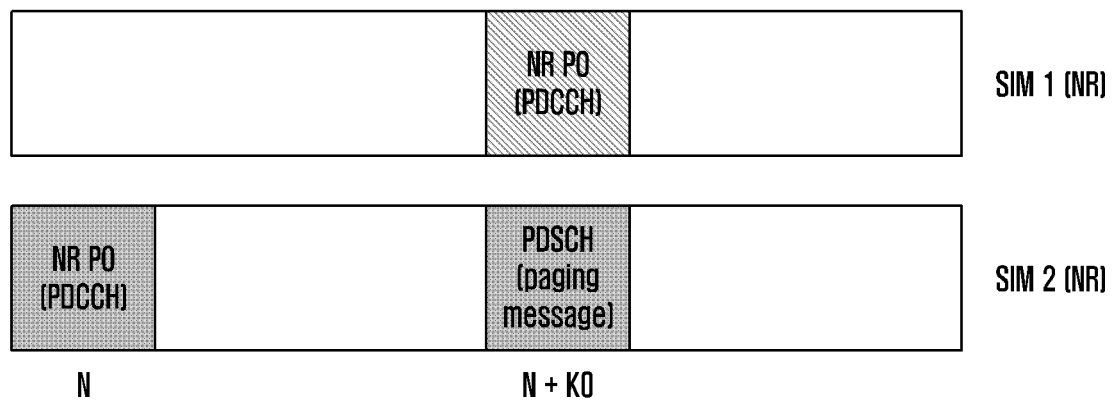
FIG. 7 illustrates another example of paging collision between multiple universal subscriber identity module (MUSIM) according to an embodiment of the disclosure.
Figure 8:
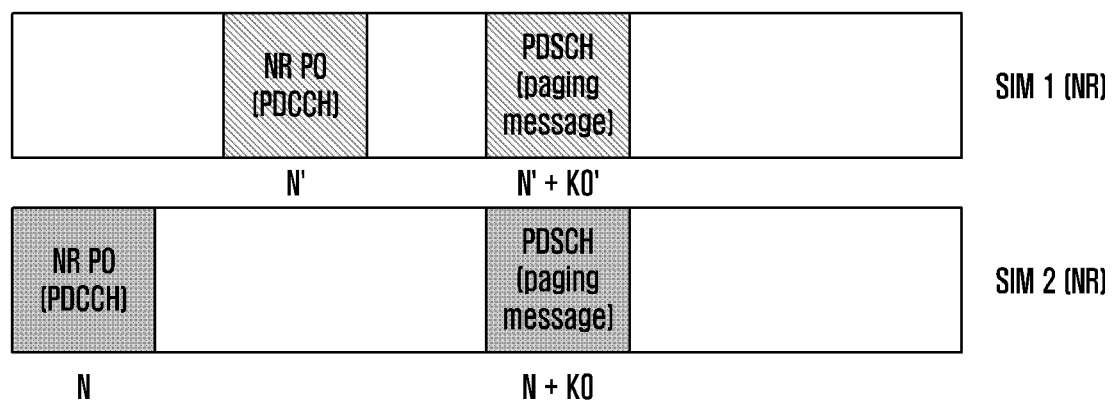
FIG. 8 illustrates another example of paging collision between multiple universal subscriber identity module (MUSIM) according to an embodiment of the disclosure.

FIGS. 6, 7, and 8 illustrate examples of paging collision between MUSIM according to various embodiments of the disclosure.

In NR, PO is the occasion in which UE receives PDCCH addressed to P-RNTI. The slot of PDSCH including paging message is indicated by PDCCH addressed to P-RNTI. So even if UE's PO of network A and network B do not overlap, UE may still not be able to receive paging in one of the networks. See examples below where there is no overlapping between POs but UE cannot receive paging message.

Referring to FIG. 6, it illustrates an example of an overlapping between LTE PO (NW1) and NR PDSCH (NW 2)

Referring to FIG. 7, it illustrates an example of an overlapping between NR PO (NW 1) and NR PDSCH (NW 2)

Referring to FIG. 8, it illustrates an example of an overlapping between NR PDSCH (NW 1) and NR PDSCH (NW 2)

Embodiment 2-1

UE supports multiple SIMs where network (NW) A is LTE and NW B is NR
UE is monitoring paging in both NW A and NW B
Starting slot of PO is slot 'n' in NW B
Maximum value of K0 in PDSCH-TimeDomainResourceAllocationList received in SIB of NW B is 'p'
Trigger condition to request for PO change wherein the condition take into account the slot of PO and candidate slot(s) for paging message in NR:
  If any of the slot 'n' to 'slot 'n+p' overlaps with LTE PO, UE send indication to NW B to relocate its PO or UE send indication to NW B to inform that it cannot receive paging due to paging monitoring in another SIM.

Embodiment 2-2

UE supports multiple SIMs where NW A is NR and NW B is NR
UE is monitoring paging in both NW A and NW B
Starting slot of PO is slot 'n' in NW B. Maximum value of K0 in PDSCH-TimeDomainResourceAllocationList received in SIB of NW B is 'p'
Starting slot of PO is slot 'n1' in NW A. Maximum value of K0 in PDSCH-TimeDomainResourceAllocationList received in SIB of NW A is 'p1'
If any of the slot 'n' to 'slot 'n+p' in NW B overlaps with slot 'n1' to 'slot 'n1+p1', UE sends indication to NW B to relocate its PO or UE send indication to NW B to inform that it cannot receive paging due to paging monitoring in another SIM.

Embodiment 2-3

UE supports multiple SIMs where NW A is LTE and NW B is NR
UE is monitoring paging in both NW A and NW B
Starting slot of PO is slot 'n' in NW B
Value of K0 used for paging a MUSIM UE is received in SIB of NW B. Let's say the value is 'q'.
  gNB shall indicate this K0 in DCI of PDCCH addressed to P-RNTI if scheduled paging message includes page for a MUSIM UE. Whether page is for MUSIM UE or not can be indicated by AMF to GNB in paging message
If any/both of the slot 'n' or 'slot 'n+q' overlaps with LTE PO, UE sends indication to NW B to relocate its PO or UE send indication to NW B to inform that it cannot receive paging due to paging monitoring in another SIM.

Embodiment 2-4

UE supports multiple SIMs where NW A is LTE and NW B is NR
UE is monitoring paging in both NW A and NW B
Starting slot of PO is slot 'n' in NW B. Value of K0 used for paging a MUSIM UE is received in SIB of NW B. Let's say the value is 'q'.
Starting slot of PO is slot 'n1' in NW A. Value of K0 used for paging a MUSIM UE is received in SIB of NW A. Let's say the value is 'q1'.
If any/both of the slot 'n' and 'slot 'n+p' in NW B overlaps with slot 'n1' or 'slot 'n1+q1' in NW A, UE send indication to NW B to relocate its PO or UE send indication to NW B to inform that it cannot receive paging due to paging monitoring in another SIM.

Embodiment 3—MAC PDU Generation

Figure 9:
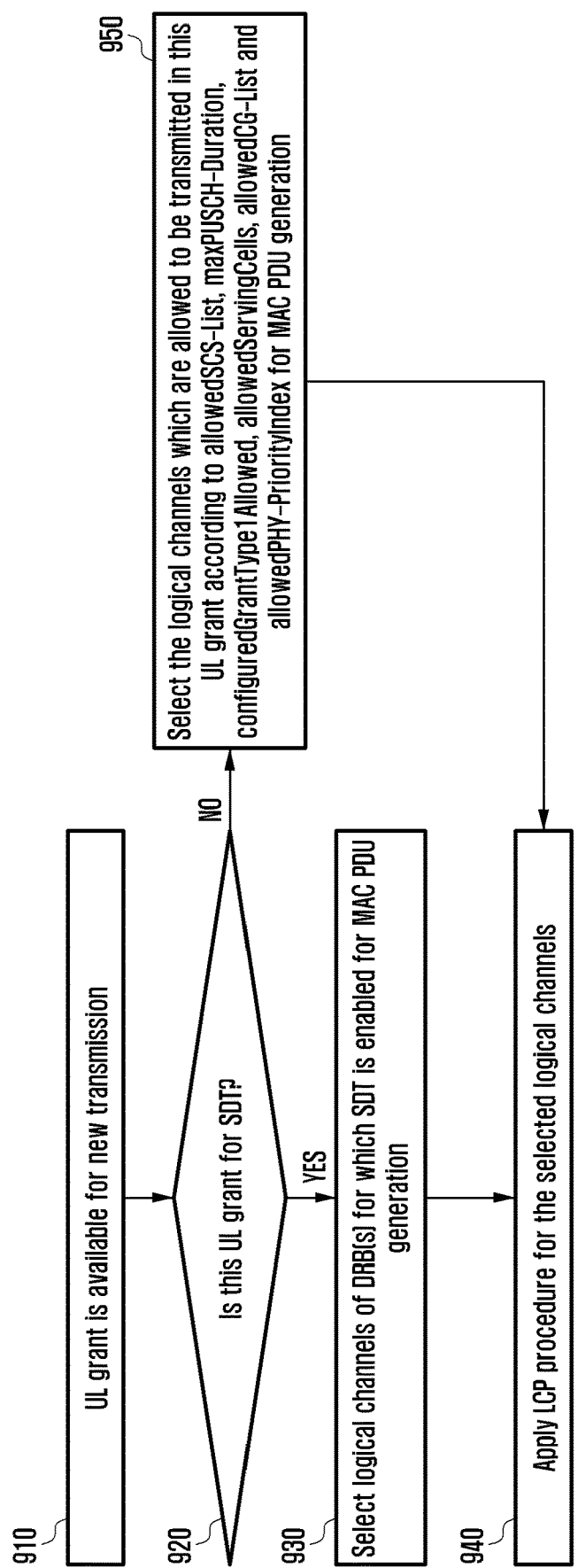
FIG. 9 illustrates an example of generating medium access control (MAC) protocol data unit (PDU) according to an embodiment of the disclosure.

FIG. 9 illustrates an example of generating MAC PDU according to an embodiment of the disclosure.

Referring to FIG. 9, in one method of this disclosure, for small data transmission (SDT) in RRC_INACTIVE using MsgA or Msg3 or preconfigured PUSCH resource, none of the LCH restrictions are applied while generating MAC PDU. However, only the logical channels of RBs for which SDT is enabled and have data available for transmission are used to generate MAC PDU.

The UE operation for generating MAC PDU for an UL grant is as follows:

1. UE receives or is configured with an UL grant for new transmission (910).

2. UE checks if the UL grant is for SDT (920). In other words, UE check whether SDT procedure is ongoing (SDT procedure can be considered ongoing if SDT timer is running, SDT timer is started when SDT procedure is initiated.

3. If yes, none of the LCH restrictions are applied while generating MAC PDU. Only the logical channels of RBs for which SDT is enabled and have data available for transmission are used to generate MAC PDU. UE select only the logical channels of RBs for which SDT is enabled for MAC PDU generation (930). Note that MAC CE(s) may be included as well. RBs for which SDT is enabled is signaled by gNB in RRC signaling. Logical channels of SRB0 and SRB1 can be also considered for MAC PDU generation. UE applies LCP procedure for the selected logical channels (940).

4. If no, UE selects the logical channels which are allowed to be transmitted in this UL grant according to allowedSCS-List, maxPUSCH-Duration, configuredGrantType1Allowed, allowedServingCells, allowedCG-List and allowedPHY-PriorityIndex for MAC PDU generation (950).

Figure 10:
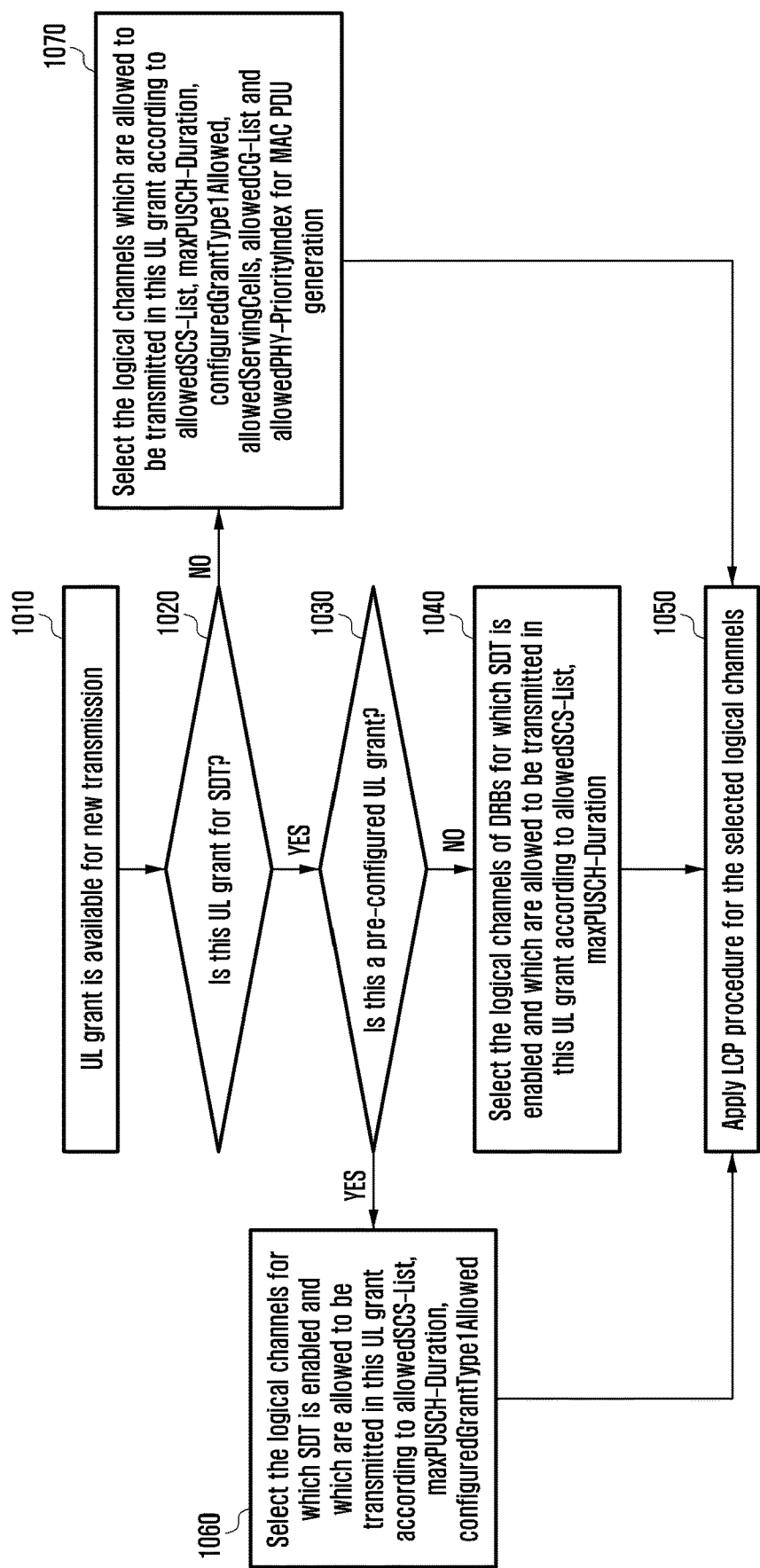
FIG. 10 illustrates another example of generating MAC PDU according to an embodiment of the disclosure.

FIG. 10 illustrates another example of generating MAC PDU according to an embodiment of the disclosure.

Referring to FIG. 10, in another method of this disclosure, the method for selecting logical channels for SDT is performed by applying allowedSCS-List and maxPUSCH-Duration for generating MAC PDU for SDT. This means that if LCH of RB for which SDT is enabled and is configured with allowedSCS-List and SCS included in allowedSCS-List is not the SCS of UL grant used for SDT, this LCH is not selected for SDT. This means that if LCH of RB for which SDT is enabled and is configured with maxPUSCH-Duration and duration included in allowedSCS-List is not the duration of UL grant used for SDT, this LCH is not selected for SDT. AllowedServingCells is not applied for generating MAC PDU for SDT. Configured Grant Type1Allowed is not applied for RACH based small data transmission but applied for non RACH based small data transmission. For non RACH based small data transmission, if LCH is not configured with configured Grant Type1Allowed, this LCH is not selected for SDT. LCH of RB for which SDT is not enabled is not selected for SDT.

1. UE receives or is configured with an UL grant for new transmission (1010).

2. UE checks if the UL grant is for SDT (1020). In other words, UE check whether SDT procedure is ongoing.

3. If yes, UE checks whether if the UL grant is a pre-configured UL grant (1030). If no, UE selects the logical channels which are allowed to be transmitted in this UL grant according to allowedSCS-List, maxPUSCH-Duration, configuredGrantType1Allowed, allowedServingCells, allowedCG-List, and allowedPHY-PriorityIndex for MAC PDU generation (1070).

4. If the UL grant is a pre-configured UL grant (1030), UE selects the logical channels for which SDT is enabled and which are allowed to be transmitted in this UL grant, according to allowedSCS-List, maxPUSCH-Duration, configuredGrantType1 Allowed (1060). Logical channels of SRB0 and SRB1 can be also considered for MAC PDU generation.

5. If the UL grant is not a pre-configured UL grant (1030), UE selects the logical channels of RBs for which SDT is enabled and which are allowed to be transmitted in this UL grant, according to allowedSCS-List, maxPUSCH-duration (1040). Logical channels of SRB0 and SRB1 can be also considered for MAC PDU generation.

6. And, UE applies LCP procedure for the selected logical channels (1050).

In another embodiment, network indicates whether to apply LCH restrictions or not. Indication can be in RRCRelease or RACH configuration for SDT. If network indicates to apply LCH restrictions, all LCH restrictions are considered while selecting LCH for SDT. In another embodiment, which restrictions to apply can also be indicated by the network. In this case, UE only applies the indicated LCH restrictions while selecting LCH for SDT.

Here, monitoring of network response for SDT using CG resource is described.

Upon performing UL transmission in CG resource for SDT, UE needs to monitor DL for network response. Network response can include resource for retransmission/new transmission, DL data or RRC message to complete SDT procedure. For network response following aspects needs to be considered.

UE needs to know search space for monitoring PDCCH. One of the following can be considered for determining search space for monitoring PDCCH.

Option 1: sdt-SearchSpace can be signaled by network in RRCRelease message.
 1-1: sdt-SearchSpace indicates one of the search space in PDCCH-ConfigCommon of initial DL BWP.
 1-2: sdt-SearchSpace indicates one of the search space in PDCCH-Config of initial DL BWP.
Option 2: sdt-SearchSpace can be signaled by network in initial DL BWP configuration (PDCCH-ConfigCommon or PDCCH-Config).
Option 3: rar-SearchSpace is used by UE for monitoring PDCCH. Or if sdt-SearchSpace is not configured UE monitors PDCCH in rar-SearchSpace.

Here, RRC message for RRC based SDT is described.

During SDT, uplink data is transmitted in Msg3/MsgA/CG. gNB receiving uplink data in Msg3/MsgA/CG needs to identify the UE, identify the last serving gNB (if the gNB to which UE is transmitting UL data is different from the GNB where UE has last received RRCRelease with suspend configuration) to retrieve the UE's context and authenticate the UE. In order to do so, additional information (such as those listed below) needs to be transmitted along with uplink data in Msg3/MsgA/CG:

Resume Identity (short or full I-RNTI) to identity the UE's context and last serving gNB (if the gNB to which UE is transmitting UL data is different from the GNB where UE has last received RRCRelease with suspend configuration).

Authentication token (i.e. resumeMAC-I) to authenticate UE.

One may argue that in case of SDT using dedicated CG, Resume Identity (short or full I-RNTI) to identity the UE's context and last serving gNB is not needed as the gNB can identify UE based on CG in which uplink data is received and the last serving gNB is the current gNB as UE performs SDT using CG only if cell is not changed (i.e. camped cell is same the cell to which UE was last connected). However, Authentication token is still needed to authenticate UE in RRC_INACTIVE.

The Resume Identity and resumeMAC-I is included in RRCResumeRequest/RRCResumeRequest1 messages. Instead of defining new mechanism to carry Resume Identity and resumeMAC-I, RRCResumeRequest/RRCResumeRequest1 message can be transmitted along with uplink data in Msg3/MsgA/CG. This is a simple approach and reduces specification effort.

An alternate approach would be to define new RRC message(s) i.e. RRCResumeRequestSDT and RRCResumeRequest1SDT. The RRCResumeRequestSDT includes Short Resume Identity and resumeMAC-I. Short Resume Identity is optional and is included for RACH based SDT procedure and not included for CG based SDT procedure. The RRCResumeRequest1SDT includes Long Resume Identity and resumeMAC-I. Since SDT is used only for MO, resume cause may not be needed as well. For new message network can always assume that resumeCause is MO-Data. Cumulative UL buffer size or data volume for DRBs for which SDT is enabled can be included in the RRC message. For CG based SDT procedure, RRCResumeRequestSDT message is transmitted without Short Resume Identity. For RACH based SDT procedure, RRCResumeRequestSDT or RRCResumeRequestSDT1 is transmitted depending on whether short or long resume identity is needed respectively. Whether to send short or long resume identity is indicated by GNB in system information. In an alternate embodiment, RRCResumeRequest1 can be used instead of RRCResumeRequestSDT1.

Embodiment 4—msgATransMax Handling for 2 Step RA Based SDT Procedure 2 step RA procedure is initiated for SDT. UE initializes the preamble transmission counter (PREAMBLE_TRANSMISSION_COUNTER) to zero.

Step 1: If contention Free Random Access Resources are provided by gNB and there is at least one SSB/CSI-RS having SS-RSRP/CSI-RSRP above a threshold amongst the SSBs/CSI-RSs for which contention free random access resources are provided, UE Transmit Random Access Preamble in PRACH occasion and MAC PDU in PUSCH Occasion using the assigned contention free random access resources. Otherwise, UE transmit Random Access Preamble in PRACH occasion and MAC PDU in PUSCH Occasion using the contention based random access resources. In an embodiment, it is possible that a valid PUSCH occasion is not available corresponding to selected SSB/CSI-RS and in this case UE skips transmission of MsgA MAC PDU.

Step 2: UE then starts msgB-ResponseWindow and monitor the PDCCH for random access response in msgB-ResponseWindow. UE monitors the PDCCH of the SpCell for a random access response identified by MSGB-RNTI while the msgB-ResponseWindow is running. If C-RNTI MAC CE was included in the MSGA: UE additionally monitor the PDCCH of the SpCell for random access response identified by the C-RNTI while the msgB-ResponseWindow is running.

Step 3: While msgB-ResponseWindow is running:
If C-RNTI was included in MsgA and UE receives PDCCH addressed to C-RNTI and this random access procedure was initiated for BFR: RAR reception is successful. RA procedure is successfully completed. Go to step 8 below.
Else If C-RNTI was included in MsgA and TAT timer associated with primary timing advance group (PTAG) is running and UE receives PDCCH addressed to C-RNTI and this PDCCH contains UL grant for new transmission: RAR reception is successful. RA procedure is successfully completed. UE releases the 2 step CFRA resources (random access preamble(s), RACH occasions, PUSCH resources) configured (if any) for this random access procedure. Release here means that UE will not use these resources for subsequent random access procedure. Go to step 8 below. In an embodiment, release operation may not be performed in this case, as contention free resources may not be configured for the case where PTAG is running and RA is initiated for events other than BFR.
Else If C-RNTI was included in MsgA and TAT timer associated with PTAG is not running and UE receives PDCCH addressed to C-RNTI and DL TB scheduled by this PDCCH includes Absolute timing advanced command MAC CE: RAR reception is successful. RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.
Else If UE receives PDCCH addressed to MSGB-RNTI and decoded TB includes fallbackRAR MAC subPDU corresponding to its transmitted preamble: RAR reception is successful.
If random access preamble transmitted is contention free random access preamble: RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.
Else
Transmit MsgA MAC PDU as Msg3 in UL grant received in fallbackRAR.
Start contention resolution timer.
Go to step 5 below.
Else If UE receives PDCCH addressed to MSGB-RNTI and decoded TB includes successRAR MAC subPDU corresponding to UE's contention resolution identity (i.e. contention resolution identity received matches the first 48 bits of CCCH SDU transmitted in MsgA): RAR reception is successful. RA procedure is successfully completed. Go to step 8. Note that this is the case when CCCH SDU is included in MSGA, that is UE is in idle/inactive or performing RRC connection re-establishment. For these cases contention free resources are not configured, so no need to release. In an alternate embodiment, UE releases the 2 step CFRA resources (random access preamble(s), RACH occasions, PUSCH resources) configured (if any) for this random access procedure. Release here means that UE will not use these resources for subsequent random access procedure.

Step 4: If RAR window expires:
Increment preamble transmission counter by 1.
If msgATransMax is configured, and if PREAMBLE_TRANSMISSION_COUNTER=msgATransMax+1:
If 4 step random access resources for SDT are configured:
Switch to 4 step RA and continue SDT procedure. Go to step 7.
Else
Terminate the ongoing SDT procedure and initiate normal connection resume procedure.
Else:
go to step 1.
(Alternate) Step 4: If RAR window expires:
Increment preamble transmission counter by 1.
If this RA procedure is not initiated for SDT and If msgATransMax is configured, and if PREAMBLE_TRANSMISSION_COUNTER=msgATransMax+1:
Switch to 4 step RA.
Else:
go to step 1.
(Alternate) Step 4: If RAR window expires:
Increment preamble transmission counter by 1.
If msgATransMax is configured, and if PREAMBLE_TRANSMISSION_COUNTER=msgATransMax+1:
If this RA procedure is not initiated for SDT: Switch to 4 step RA.
If this RA procedure is initiated for SDT: Terminate the ongoing SDT procedure and initiate normal connection resume procedure.
Else:
go to step 1.
Step 5: While contention resolution timer is running:
If the Random Access procedure was initiated for beam failure recovery and the UE receives PDCCH transmission addressed to the C-RNTI; or if the Random Access procedure was initiated by a PDCCH order and the UE receives PDCCH transmission addressed to the C-RNTI; or if the Random Access procedure was initiated by the MAC sublayer itself or by the RRC sublayer and the UE receives PDCCH transmission addressed to the C-RNTI and contains a UL grant for a new transmission: Contention Resolution is successful; RA procedure is successfully completed. Release 2 step CFRA Resources i.e. preambles/ROs/PUSCH Resources configured (if any) for this RA procedure. Go to step 8. Release here means that UE will not use these resources for subsequent random access procedure.
Step 6: If contention resolution timer expires:
Increment preamble transmission counter by 1.
If msgATransMax is configured, and if PREAMBLE_TRANSMISSION_COUNTER=msgATransMax+1:
If 4 step random access resources for SDT are configured:
Switch to 4 step RA and continue SDT procedure. Go to step 7 below.
Else
Terminate the ongoing SDT procedure and initiate normal connection resume procedure.

Else:
 go to step 1.
(Alternate) Step 6: If contention resolution timer expires:
Increment preamble transmission counter by 1.
 If this RA procedure is not initiated for SDT and If msgATransMax is configured, and if PREAMBLE_TRANSMISSION_COUNTER=msgATransMax+1:
  Switch to 4 step RA.
Else:
 go to step 1
(Alternate) Step 6: If contention resolution timer expires:
Increment preamble transmission counter by 1.
 If msgATransMax is configured, and if PREAMBLE_TRANSMISSION_COUNTER=msgATransMax+1:
  If this RA procedure is not initiated for SDT: Switch to 4 step RA.
  If this RA procedure is initiated for SDT: Terminate the ongoing SDT procedure and initiate normal connection resume procedure
Else:
 go to step 1
Step 7: perform 4 step RA for SDT.
Step 8: Stop.

Figure 11:
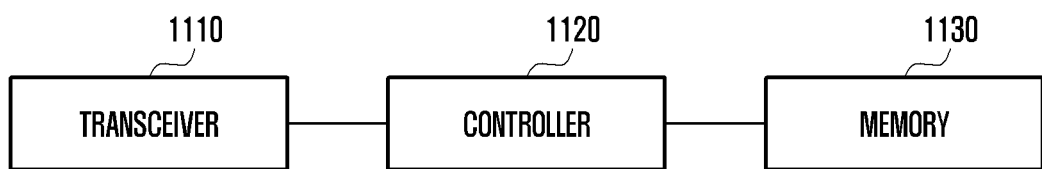
FIG. 11 is a block diagram of a terminal according to an embodiment of the disclosure.

FIG. 11 is a block diagram of a terminal according to an embodiment of the disclosure.

Referring to FIG. 11, a terminal includes a transceiver 1110, a controller 1120 and a memory 1130. The controller 1120 may refer to a circuitry, an application-specific integrated circuit (ASIC), or at least one processor. The transceiver 1110, the controller 1120 and the memory 1130 are configured to perform the operations of the terminal illustrated in the FIG. 1 to 10, or described above. Although the transceiver 1110, the controller 1120 and the memory 1130 are shown as separate entities, they may be realized as a single entity like a single chip. Or, the transceiver 1110, the controller 1120 and the memory 1130 may be electrically connected to or coupled with each other.

The transceiver 1110 may transmit and receive signals to and from other network entities, e.g., a base station.

The controller 1120 may control the terminal to perform functions according to one of the embodiments described above. For example, the controller 1120 controls the transceiver 1110 and/or memory 1130 to perform small data transmission and reception according to various embodiments of the disclosure.

In an embodiment, the operations of the terminal may be implemented using the memory 1130 storing corresponding program codes. Specifically, the terminal may be equipped with the memory 1130 to store program codes implementing desired operations. To perform the desired operations, the controller 1120 may read and execute the program codes stored in the memory 1130 by using at least one processor or a CPU.

Figure 12:
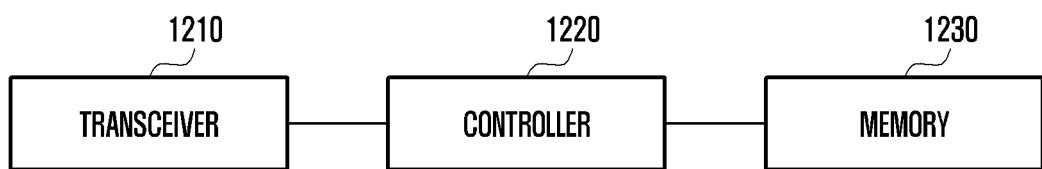
FIG. 12 is a block diagram of a base station according to an embodiment of the disclosure.

FIG. 12 is a block diagram of a base station according to an embodiment of the disclosure.

Referring to FIG. 12, a base station includes a transceiver 1210, a controller 1220 and a memory 1230. The controller 1220 may refer to a circuitry, an ASIC, or at least one processor. The transceiver 1210, the controller 1220 and the memory 1230 are configured to perform the operations of the base station illustrated in the FIG. 1 to 10, or described above. Although the transceiver 1210, the controller 1220 and the memory 1230 are shown as separate entities, they may be realized as a single entity like a single chip. Or, the transceiver 1210, the controller 1220 and the memory 1230 may be electrically connected to or coupled with each other.

The transceiver 1210 may transmit and receive signals to and from other network entities, e.g., a terminal or a UE.

The controller 1220 may control the base station to perform functions according to one of the embodiments described above. For example, the controller 1220 controls the transceiver 1210 and/or memory 1230 to perform small data transmission and reception according to various embodiments of the disclosure.

In an embodiment, the operations of the base station may be implemented using the memory 1230 storing corresponding program codes. Specifically, the base station may be equipped with the memory 1230 to store program codes implementing desired operations. To perform the desired operations, the controller 1220 may read and execute the program codes stored in the memory 1230 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
 receiving, from a source base station, a first radio resource control (RRC) message comprising information on sidelink parameters for sidelink communication;
 applying the sidelink parameters included in the first RRC message to a first medium access control (MAC) entity associated with the source base station;
 receiving, from the source base station, a second RRC message comprising reconfiguration with synchronization information and information on the sidelink parameters for sidelink communication;
 generating a second MAC entity associated with a target base station, in case that at least one dual active protocol stack (DAPS) bearer is configured in the second RRC message;
 applying the sidelink parameters included in the second RRC message to the second MAC entity associated with the target base station; and
 performing a random access procedure with the target base station based on the second RRC message.

2. The method of claim 1, further comprising:
 partially resetting the first MAC entity, in case that the at least one DAPS bearer is configured in the second RRC message,
 wherein a partial reset of the first MAC entity comprises:
  setting new data indicator (NDI) for all hybrid automatic repeat request (HARQ) process identities to a value of 0 for monitoring a physical downlink control channel (PDCCH) in sidelink resource allocation mode 1,
  cancelling triggered sidelink buffer status reporting (BSR) procedure,
  cancelling triggered scheduling request (SR) procedure for sidelink,
  flushing soft buffers for all sidelink processes, and
  stopping all timers related to sidelink.

3. The method of claim 1, further comprising:
resetting the first MAC entity, in case that DAPS bearer is not configured in the second RRC message;
applying the sidelink parameters included in the second RRC message to the first MAC entity associated with the source base station; and
releasing the sidelink parameters included in the first RRC message.

4. The method of claim 1, wherein, in case that a T304 timer expires and a radio link failure (RLF) is not detected, the method further comprises:
applying the sidelink parameters included in the first RRC message to the first MAC entity associated with the source base station; and
releasing the second MAC entity associated with the target base station.

5. The method of claim 1, wherein, in case that a T304 timer expires and a radio link failure (RLF) is detected, the method further comprises:
releasing the second MAC entity associated with the target base station; and
initiating an RRC connection reestablishment procedure.

6. A method performed by a source base station in a wireless communication system, the method comprising:
transmitting, to a terminal, a first radio resource control (RRC) message comprising information on sidelink parameters for sidelink communication, the sidelink parameters included in the first RRC message are for a first medium access control (MAC) entity associated with the source base station; and
transmitting, to the terminal, a second RRC message comprising reconfiguration with synchronization information and information on the sidelink parameters for sidelink communication, the sidelink parameters included in the second RRC message are for a second MAC entity associated with a target base station,
wherein the second MAC entity is generated for the target base station, in case that at least one dual active protocol stack (DAPS) bearer is configured in the second RRC message, and
wherein a random access procedure is performed between the terminal and the target base station based on the second RRC message.

7. The method of claim 6,
wherein, in case that the at least one DAPS bearer is configured in the second RRC message, the first MAC entity is partially reset, and
wherein a partial reset of the first MAC entity comprises:
setting new data indicator (NDI) for all hybrid automatic repeat request (HARQ) process identities to a value of 0 for monitoring a physical downlink control channel (PDCCH) in sidelink resource allocation mode 1,
cancelling triggered sidelink buffer status reporting (BSR) procedure,
cancelling triggered scheduling request (SR) procedure for sidelink,
flushing soft buffers for all sidelink processes, and
stopping all timers related to sidelink.

8. The method of claim 6, wherein, in case that DAPS bearer is not configured in the second RRC message, the first MAC entity is reset, the sidelink parameters included in the second RRC message are applied to the first MAC entity, and the sidelink parameters included in the first RRC message are released.

9. The method of claim 6, wherein, in case that a T304 timer expires and a radio link failure (RLF) is not detected, the sidelink parameters included in the first RRC message are applied to the first MAC entity, and the second MAC entity is released.

10. The method of claim 6, wherein, in case that a T304 timer expires and a radio link failure (RLF) is detected, the second MAC entity is released, and an RRC connection reestablishment procedure is initiated.

11. A terminal in a wireless communication system, the terminal comprising:
a transceiver configured to transmit or receive a signal; and
at least one processor configured to:
receive, from a source base station, a first radio resource control (RRC) message comprising information on sidelink parameters for sidelink communication,
apply the sidelink parameters included in the first RRC message to a first medium access control (MAC) entity associated with the source base station,
receive, from the source base station, a second RRC message comprising reconfiguration with synchronization information and information on the sidelink parameters for sidelink communication,
generate a second MAC entity associated with a target base station, in case that at least one dual active protocol stack (DAPS) bearer is configured in the second RRC message,
apply the sidelink parameters included in the second RRC message to the second MAC entity associated with the target base station, and
perform a random access procedure with the target base station based on the second RRC message.

12. The terminal of claim 11,
wherein the at least one processor is further configured to partially reset the first MAC entity, in case that the at least one DAPS bearer is configured in the second RRC message, and
wherein a partial reset of the first MAC entity comprises:
setting new data indicator (NDI) for all hybrid automatic repeat request (HARQ) process identities to a value of 0 for monitoring a physical downlink control channel (PDCCH) in sidelink resource allocation mode 1,
cancelling triggered sidelink buffer status reporting (BSR) procedure,
cancelling triggered scheduling request (SR) procedure for sidelink,
flushing soft buffers for all sidelink processes, and
stopping all timers related to sidelink.

13. The terminal of claim 11, wherein the at least one processor is further configured to:
reset the first MAC entity, in case that DAPS bearer is not configured in the second RRC message,
apply the sidelink parameters included in the second RRC message to the first MAC entity associated with the source base station, and
release the sidelink parameters included in the first RRC message.

14. The terminal of claim 11, wherein, in case that a T304 timer expires and a radio link failure (RLF) is not detected, the at least one processor is further configured to:
apply the sidelink parameters included in the first RRC message to the first MAC entity associated with the source base station, and
release the second MAC entity associated with the target base station.

15. The terminal of claim 11, wherein, in case that a T304 timer expires and a radio link failure (RLF) is detected, the at least one processor is further configured to:
 release the second MAC entity associated with the target base station, and
 initiate an RRC connection reestablishment procedure.

16. A source base station in a wireless communication system, the source base station comprising:
 a transceiver configured to transmit or receive a signal; and
 at least one processor configured to:
  transmit, to a terminal, a first radio resource control (RRC) message comprising information on sidelink parameters for sidelink communication, the sidelink parameters included in the first RRC message are for a first medium access control (MAC) entity associated with the source base station, and
  transmit, to the terminal, a second RRC message comprising reconfiguration with synchronization information and information on the sidelink parameters for sidelink communication, the sidelink parameters included in the second RRC message are for a second MAC entity associated with a target base station,
 wherein the second MAC entity is generated for the target base station, in case that at least one dual active protocol stack (DAPS) bearer is configured in the second RRC message, and
 wherein a random access procedure is performed between the terminal and the target base station based on the second RRC message.

17. The source base station of claim 16,
 wherein, in case that the at least one DAPS bearer is configured in the second RRC message, the first MAC entity is partially reset, and
 wherein a partial reset of the first MAC entity comprises:
  setting new data indicator (NDI) for all hybrid automatic repeat request (HARQ) process identities to a value of 0 for monitoring a physical downlink control channel (PDCCH) in sidelink resource allocation mode 1,
  cancelling triggered sidelink buffer status reporting (BSR) procedure,
  cancelling triggered scheduling request (SR) procedure for sidelink,
  flushing soft buffers for all sidelink processes, and
  stopping all timers related to sidelink.

18. The source base station of claim 16, wherein, in case that DAPS bearer is not configured in the second RRC message, the first MAC entity is reset, the sidelink parameters included in the second RRC message are applied to the first MAC entity, and the sidelink parameters included in the first RRC message are released.

19. The source base station of claim 16, wherein, in case that a T304 timer expires and a radio link failure (RLF) is not detected, the sidelink parameters included in the first RRC message are applied to the first MAC entity, and the second MAC entity is released.

20. The source base station of claim 16, wherein, in case that a T304 timer expires and a radio link failure (RLF) is detected, the second MAC entity is released, and an RRC connection reestablishment procedure is initiated.

* * * * *